United States Patent [19]
Klier et al.

[11] Patent Number: 5,684,138
[45] Date of Patent: Nov. 4, 1997

[54] ASYMMETRICAL REACTIVE DYES CONTAINING TWO TRIAZINYL RADICALS WHICH ARE BRIDGED VIA AN ALIPHATIC BRIDGE MEMBER

[75] Inventors: Herbert Klier, Bad Krozingen-Biengen; Bernhard Müller, Efringen-Kirchen, both of Germany; Edmond Ruhlmann, Saint-Louis, France; Athanassios Tzikas, Pratteln, Switzerland

[73] Assignee: Ciba Specialty Chemicals Corporation, Tarrytown, N.Y.

[21] Appl. No.: 657,455

[22] Filed: May 29, 1996

Related U.S. Application Data

[63] Continuation of Ser. No. 242,514, May 13, 1994, Pat. No. 5,552,532.

[30] Foreign Application Priority Data

May 17, 1993 [CH] Switzerland ............................ 1494/93
Jun. 29, 1993 [CH] Switzerland ............................ 1950/93

[51] Int. Cl.$^6$ ........................ C09B 62/04; C09B 62/503; D06P 1/38; D06P 3/66
[52] U.S. Cl. ........................ 534/612; 534/618; 534/624; 534/634; 8/549
[58] Field of Search ........................ 534/618, 634, 534/612, 624

[56] References Cited

U.S. PATENT DOCUMENTS

| | | | |
|---|---|---|---|
| 5,122,605 | 6/1992 | Pedrazzi | 534/634 X |
| 5,149,789 | 9/1992 | Jessen | 534/618 |
| 5,200,511 | 4/1993 | Laeffler | 534/634 |
| 5,232,462 | 8/1993 | Tzikas | 8/549 |
| 5,245,020 | 9/1993 | Jessen | 534/618 |
| 5,395,925 | 3/1995 | Koch et al. | 534/634 |

FOREIGN PATENT DOCUMENTS

| | | |
|---|---|---|
| 0391264 | 10/1990 | European Pat. Off. . |
| 0478503 | 4/1992 | European Pat. Off. . |
| 495753 | 7/1992 | European Pat. Off. . |
| 0511523 | 11/1992 | European Pat. Off. . |
| 606345 | 10/1978 | Switzerland . |
| 621358 | 1/1981 | Switzerland . |
| 854432 | 11/1960 | United Kingdom . |
| 2085908 | 5/1982 | United Kingdom . |

OTHER PUBLICATIONS

Norek et al., Chemical Abstracts, 99:55059 (1982).

*Primary Examiner*—Fiona T. Powers
*Attorney, Agent, or Firm*—Kevin T. Mansfield

[57] ABSTRACT

Reactive dyes of the formula

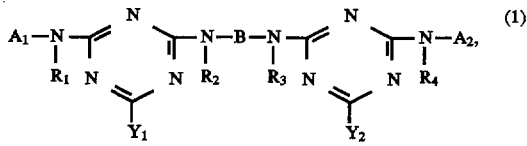

in which $R_1$, $R_2$, $R_3$ and $R_4$ independently of one another are hydrogen or substituted or unsubstituted $C_1$–$C_4$alkyl, B is an aliphatic bridge member, $Y_1$ and $Y_2$ independently of one another are halogen or carboxypyridinium, $A_1$ is the radical of an anthraquinone, phthalocyanine, dioxazine, formazan or disazo dye or a radical of the formulae (2a) to (2h) defined in claim 1 and $A_2$ is as defined above for $A_1$ or is a radical of the formulae (2i) to (2m), where $A_1$ and $A_2$ have different meanings to one another, are particularly suitable for dyeing or printing fibre materials containing hydroxyl groups or containing nitrogen. Dyeings having good fastness properties coupled with a high tinctorial yield are obtained.

11 Claims, No Drawings

ASYMMETRICAL REACTIVE DYES CONTAINING TWO TRIAZINYL RADICALS WHICH ARE BRIDGED VIA AN ALIPHATIC BRIDGE MEMBER

This is a Continuation of Application Ser. No. 08/242,514 filed May 13, 1994 now U.S. Pat. No. 5,552,532.

The present invention relates to novel reactive dyes, processes for their preparation and their use for dyeing or printing fibre materials.

The practice of dyeing using reactive dyes has recently led to increased demands on the quality of the dyeings and the profitability of the dyeing process. There is consequently still a demand for novel reactive dyes which have improved properties, especially in respect of application.

Reactive dyes which have an adequate substantivity and at the same time a good ease of washing out of the non-fixed portions are now required for dyeing. They should furthermore have a good tinctorial yield and high reactivity, and dyeings having high degrees of fixing in particular should be produced. These requirements are not met in all properties by the known dyes.

The present invention is therefore based on the object of discovering novel improved reactive dyes for dyeing and printing fibre materials which have the qualities characterized above to a high degree. The novel dyes in particular should have high fixing yields and high fibre-dye bond stabilities, and furthermore the portions which are not fixed to the fibre should be easy to wash out. They should furthermore produce dyeings having good allround properties, for example light- and wet-fastnesses.

It has been found that this object is largely achieved by the reactive dyes defined below.

The invention therefore relates to reactive dyes of the formula

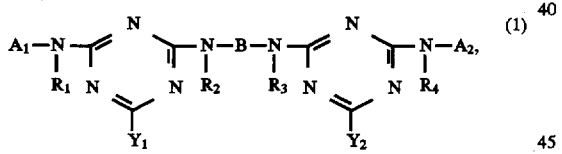

(1)

in which $R_1$, $R_2$, $R_3$ and $R_4$ independently of one another are hydrogen or substituted or unsubstituted $C_1$–$C_4$alkyl, B is an aliphatic bridge member, $Y_1$ and $Y_2$ independently of one another are halogen or carboxypyridinium, $A_1$ is the radical of an anthraquinone, phthalocyanine, dioxazine, formazan or disazo dye, or a radical of the formula

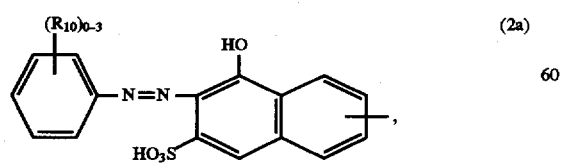

(2a)

in which $R_{10}$ is 0 to 3 identical or different substituents from the group comprising $C_1$–$C_4$alkyl, $C_1$–$C_4$alkoxy, halogen, carboxyl and sulfo,

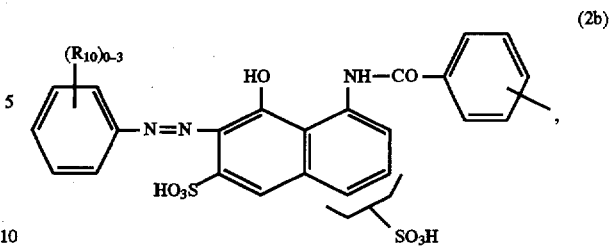

(2b)

in which $R_{10}$ is 0 to 3 identical or different substituents from the group comprising $C_1$–$C_4$alkyl, $C_1$–$C_4$alkoxy, halogen, carboxyl and sulfo,

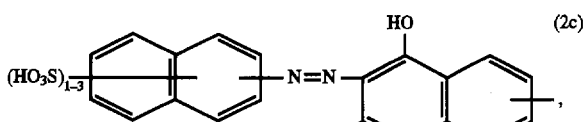

(2c)

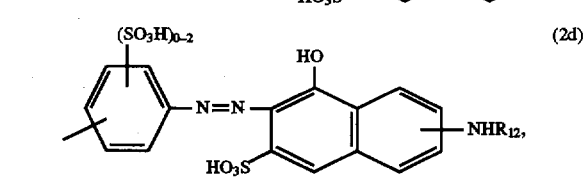

(2d)

in which $R_{12}$ is $C_1$–$C_4$alkanoyl, benzoyl or a halotriazinyl radical, which may be further substituted,

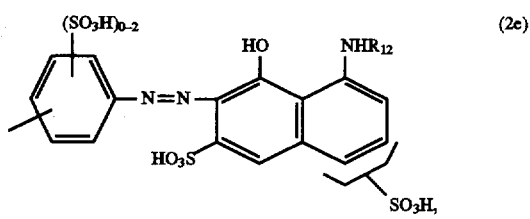

(2e)

in which $R_{12}$ is $C_1$–$C_4$alkanoyl, benzoyl or a halotriazinyl radical, which may be further substituted,

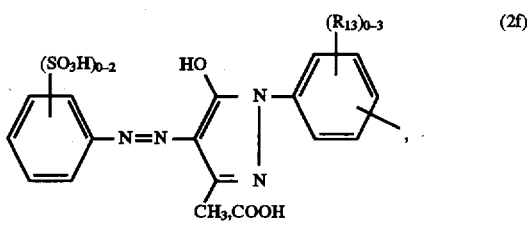

(2f)

in which $R_{13}$ is 0 to 3 identical or different substituents from the group comprising $C_1$–$C_4$alkyl, $C_1$–$C_4$alkoxy, halogen, carboxyl and sulfo,

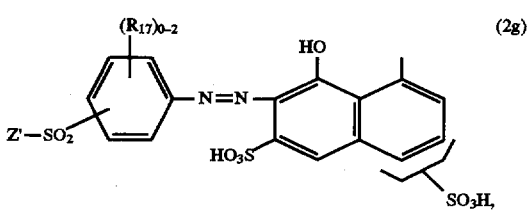

(2g)

in which $R_{17}$ is 0 to 2 identical or different substituents from the group comprising $C_1$–$C_4$alkyl, $C_1$–$C_4$alkoxy, halogen, carboxyl and sulfo; and Z' is β-sulfatoethyl, β-thiosulfatoethyl, β-phosphatoethyl, β-acyloxyethyl, β-haloethyl or vinyl, or

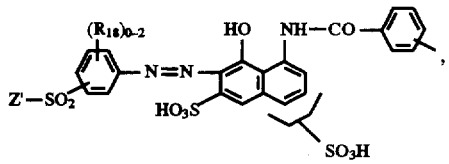 (2h)

in which $R_{18}$ is 0 to 2 identical or different substituents from the group comprising $C_1$–$C_4$alkyl, $C_1$–$C_4$alkoxy, halogen, carboxyl and sulfo; and Z' is β-sulfatoethyl, β-thiosulfatoethyl, β-phosphatoethyl, β-acyloxyethyl, β-haloethyl or vinyl, and $A_2$ is as defined above for $A_1$ or is a radical of the formula

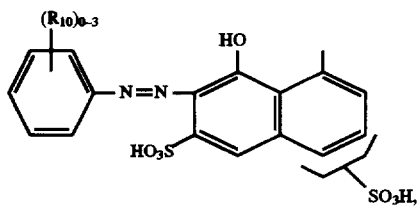 (2i)

in which $R_{10}$ is 0 to 3 identical or different substituents from the group comprising $C_1$–$C_4$alkyl, $C_1$–$C_4$alkoxy, halogen, carboxyl and sulfo,

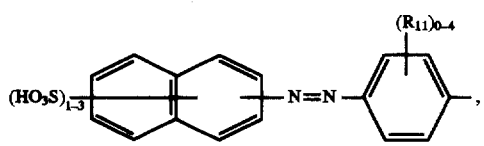 (2j)

in which $R_{11}$ is 0 to 4 identical or different substituents from the group comprising halogen, nitro, cyano, trifluoromethyl, sulfamoyl, carbamoyl, $C_1$–$C_4$alkyl, $C_1$–$C_4$alkoxyl, amino, acetylamino, ureido, hydroxyl, carboxyl, sulfomethyl and sulfo,

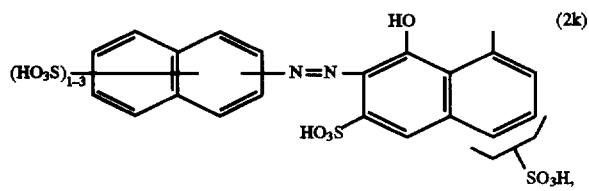 (2k)

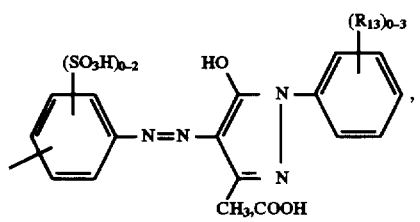 (2l)

in which $R_{13}$ is 0 to 3 identical or different substituents from the group comprising $C_1$–$C_4$alkyl, $C_1$–$C_4$alkoxy, halogen, carboxyl and sulfo, or

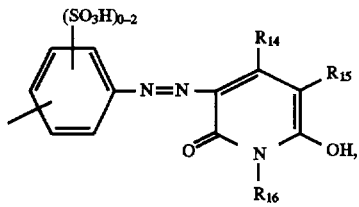 (2m)

in which $R_{14}$ and $R_{16}$ independently of one another are hydrogen, $C_1$–$C_4$alkyl or phenyl, and $R_{15}$ is hydrogen, cyano, carbamoyl or sulfomethyl, where $A_1$ and $A_2$ have different meanings to one another.

Alkyl radicals $R_1$, $R_2$, $R_3$ and $R_4$ in the reactive dye of the formula (1) are straight-chain or branched; the alkyl radicals can be further substituted, for example by halogen, hydroxyl, cyano, $C_1$–$C_4$alkoxy, $C_1$–$C_4$alkoxycarbonyl, carboxyl, sulfamoyl, sulfo or sulfato. Examples of the radicals $R_1$, $R_2$, $R_3$ and $R_4$ are the following: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably, $R_1$, $R_2$, $R_3$ and $R_4$ independently of one another are hydrogen, methyl or ethyl, in particular hydrogen.

The aliphatic bridge member B in the reactive dye of the formula (1) is preferably a $C_2$–$C_{12}$alkylene radical, which can be interrupted by 1, 2 or 3 members from the group comprising —NH—, —N(CH$_3$)— and —O— and is unsubstituted or substituted by hydroxyl, sulfo or sulfato.

The bridge member B in the reactive dye of the formula (1) is preferably a $C_2$–$C_{12}$alkylene radical, which can be interrupted by 1, 2 or 3 —O—radicals.

The bridge member B in the reactive dye of the formula (1) is particularly preferably a $C_2$–$C_6$alkylene radical, in particular a radical of the formula —(CH$_2$)$_{2-6}$—, preferably ethylene or propylene.

The radicals $Y_1$ and $Y_2$ in the reactive dye of the formula (1) independently of one another are, in particular, fluorine or chlorine.

Radicals $A_1$ and $A_2$ of an anthraquinone, phthalocyanine, dioxazine, formazan or disazo dye in the reactive dye of the formula (1) can contain the substituents customary in organic dyes bonded to their basic structure.

Examples of substituents in the radicals $A_1$ and $A_2$ are: alkyl groups having 1 to 4 carbon atoms, such as methyl, ethyl, propyl, isopropyl or butyl, where the alkyl radicals can be further substituted, for example by hydroxyl, sulfo or sulfato; alkoxy groups having 1 to 4 carbon atoms, such as methoxy, ethoxy, propoxy, isopropoxy or butoxy, where the alkyl radicals can be further substituted, for example by hydroxyl, sulfo or sulfato; phenyl which is unsubstituted or substituted by $C_1$–$C_4$alkyl, $C_1$–$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$alkyl, $C_1$–$C_4$alkoxy, halogen or sulfo; phenylamino which is unsubstituted or substituted in the phenyl ring by $C_1$–$C_4$alkyl, $C_1$–$C_4$alkoxy, halogen or sulfo; N,N-di-β-hydroxyethylamino; N,N-di-β-sulfatoethylamino; sulfobenzylamino; N,N-disulfobenzylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; N-alkylcarbamoyl having 1 to 4 carbon atoms in the alkyl radical, such as N-methylcarbamoyl or N-ethylcarbamoyl; sulfamoyl; N-mono- or N,N-dialkylsulfamoyl having in each case 1 to 4 carbon atoms, such as N-methylsulfamoyl, N-ethylsulfamoyl, N-propylsulfamoyl, N-isopropylsulfamoyl or N-butylsulfamoyl, where the alkyl radicals can be further substituted, for example by hydroxyl or sulfo; N-(β-hydroxyethyl)sulfamoyl; N,N-di(β-hydroxyethyl)sulfamoyl; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo and fibre-reactive radicals.

The radicals $A_1$ and $A_2$ preferably in each case contain at least one sulfo group, in particular 1 to 4 sulfo groups, and preferably 1 to 3 sulfo groups.

A reactive group in a radical $A_1$ or $A_2$ of an anthraquinone, phthalocyanine, dioxazine, formazan or disazo dye is, for example, an alkanoyl or alkylsulfonyl radical substituted by an atom which can be split off or a group which can be split off, an alkenoyl or alkenesulfonyl radical which is unsubstituted or substituted by an atom which can be split off or a group which can be split off, or an alkenoyl or alkenesulfonyl radical containing a vinyl group. The alkanoyl, alkylsulfonyl and alkenesulfonyl radicals mentioned as a rule contain 2 to 8 carbon atoms and the alkenoyl radicals as a rule contain 3 to 8 carbon atoms. Radicals containing carbo- or heterocyclic 4-, 5- or 6-membered rings substituted by an atom which can be split off or a group which can be split off are further examples. Heterocyclic radicals are, for example, those which contain at least one substituent which can be split off bonded to a heterocyclic radical; inter alia, those which contain at least one reactive substituent bonded to a 5- or 6-membered heterocyclic ring, such as to a monoazine, diazine, triazine, pyridine, pyrimidine, pyridazine, pyrazine, thiazine, oxazine or asymmetric or symmetric triazine ring or to such a ring system which contains one or more fused aromatic rings, such as a quinoline, phthalazine, cinnoline, quinazoline, quinoline, acridine, phenazine and phenanthridine ring system.

Atoms which can be split off and groups which can be split off are, in addition to others, for example, halogen, such as fluorine, chlorine or bromine, ammonium, including hydrazinium, sulfato, thiosulfato, phosphato, acetoxy, propionoxy, azido, carboxypyridinium or thiocyanato.

Bridge members between the dye radical and the fibre-reactive radical are, in addition to the direct bond, the most diverse radicals. The bridge member is, for example, an aliphatic, aromatic or heterocyclic radical; the bridge member furthermore can be composed of various such radicals. The bridge member as a rule contains at least one functional group, for example the carbonyl group or the amino group, where the amino group can be further substituted by $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato. An aliphatic radical is, for example, an alkylene radical having 1 to 7 carbon atoms or branched isomers thereof. The carbon chain of the alkylene radical can be interrupted by a heteroatom, for example an oxygen atom. An aromatic radical is, for example, a phenyl radical, which can be substituted by $C_1$–$C_4$alkyl, for example methyl or ethyl, $C_1$–$C_4$alkoxy, for example methoxy or ethoxy, halogen, for example fluorine, bromine or, in particular, chlorine, car- boxyl or sulfo, and a heterocyclic radical is, for example, a piperazine radical.

Examples of reactive groups are the following:
vinylsulfonyl, β-chloroethylsulfonyl, β-sulfatoethylsulfonyl, β-acetoxy-ethylsulfonyl, phosphatoethylsulfonyl, β-thiosulfatoethylsulfonyl, N-methyl-N-(β-sulfoethylsulfonyl)amino, acryloyl, mono-, di- or trichloroacryloyl, such as —CO—CCl=$CH_2$, —CO—CH=CH—Cl, —CO—CCl=CH—$CH_3$; mono-, di- or tribromoacryloyl, such as —CO—CBr=—$CH_2$, —CO—CH=CH—Br, —CO—CBr=CH—$CH_3$, and —CO—CCl=CH—COOH, —CO—CH=CCl—COOH, —CO—CBr=CH—COOH, —CO—CH=CBr—COOH, —CO—CCl=CCl—COOH, —CO—CBr=—CBr—COOH; precursors of the acryloyl radical and of derivatives of the acryloyl radical, such as β-chloro- or β-bromopropionyl, 3-phenylsulfonylpropionyl, 3-methylsulfonylpropionyl, 2-chloro-3-phenylsulfonylpropionyl, 2,3-dichloropropionyl, 2,3-dibromopropionyl; and 2-fluoro-2-chloro-3,3-difluorocyclobutane-1-carbonyl, 2,2,3,3-tetrafluorocyclobutane-1-carbonyl or -1-sulfonyl, β-(2,2, 3,3-tetrafluorocyclobut-1-yl)acryloyl, α- or β-alkenyl- or arylsulfonylacryloyl groups, such as α- or β-methylsulfonylacryloyl, chloroacetyl, bromoacetyl, 4-(β-chloroethylsulfonyl)butyryl, 4-vinylsulfonylbutyryl, 5-(β-chloroethylsulfonyl)caproyl, 6-vinylsulfonylcaproyl; and 4-fluoro-3-nitrobenzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl.

The following fibre-reactive radicals may furthermore be mentioned as examples:
mono- or dihalo-symmetric triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl or 2-ethylamino- or 3-propylamino-4-chlorotriazin-6-yl, 2-β-oxyethylamino-4-chlorotriazin-6-yl, 2-di-β-oxyethylamino-4-chlorotriazin-6-yl and the corresponding sulfuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or sulfophenyl)amino-4-chlorotriazin-6-yl, 2-alkoxy-4-chlorotriazin-6-yl, such as 2-methoxy- or -ethoxy-4-chlorotriazin-6-yl, 2-(phenylsulfonylmethoxy)-4-chlorotriazin-6-yl, 2-aryloxy and substituted aryloxy-4-chlorotriazin-6-yl, such as 2-phenoxy-4-chlorotriazin-6-yl, 2-(p-sulfophenyl)oxy-4-chlorotriazin-6-yl, 2-(o-, m- or p-methyl- or methoxyphenyl)oxy-4-chlorotriazin-6-yl, 2-alkylmercapto- or 2-arylmercapto- or 2-(substituted aryl)mercapto-4-chlorotriazin-6-yl, such as 2-β-hydroxyethylmercapto-4-chlorotriazin-6-yl, 2-phenylmercapto-4-chlorotriazin-6-yl, 3-(4'-methylphenyl)mercapto-4-chlorotriazin-6-yl, 2-(2',4'-dinitro)phenylmercapto-4-chlorotriazin-6-yl, 2-methyl-4-chlorotriazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, where alkyl is, in particular, substituted or unsubstituted $C_1$–$C_4$alkyl, aralkyl is, in particular, substituted or unsubstituted phenyl-$C_1$–$C_4$alkyl and aryl is, in particular, phenyl or naphthyl which are unsubstituted or substituted by sulfo, $C_1$–$C_4$alkyl, $C_1$–$C_4$alkoxy, carboxylic acid groups, acylamino groups and halogen atoms, such as fluorine, chlorine or bromine, for example 2-amino-4-fluorotriazin-6-yl, 2-methylamino-4-fluorotriazin-6-yl, 2-ethylamino-4-fluorotriazin-6-yl, 2-iso-propylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulfoethylamino-4-fluorotriazin-6-yl, 2-β-sulfoethylmethylamino-4-fluorotriazin-6-yl, 2-carboxymethylamino-4-fluorotriazin-6-yl, 2-β-cyanoethylamino-4-fluorotriazin-6-yl, 2-benzolamino-4-fluorotriazin-6-yl, 2-β-phenylethylamino-4-fluorotriazin-6-yl, 2-benzylmethylamino-4-fluorotriazin-6-yl, 2-(2'-, 3'- or 4'-sulfobenzyl)amino-4-fluorotriazin-6-yl, 2-cyclohexylamino-4-fluorotriazin-6-yl, 2-(o-, m- or p-methylphenyl)amino-4-fluorotriazin-6-yl, 2-(o-, m- or p-sulfophenyl)amino-4-fluorotriazin-6-yl, 2-(2',5'-disulfophenyl)amino-4-fluorotriazin-6-yl, 2-(o-, m- or p-chlorophenyl)amino-4-fluorotriazin-6-yl, 2-(o-, m- or p-methoxyphenyl)-4-fluorotriazin-6-yl, 2-(2'-methyl-4'-sulfophenyl)amino-4-fluorotriazin-6-yl, 2-(2'-methyl-5'-sulfophenyl)amino-4-fluorotriazin-6-yl, 2-(2'-chloro-4'-sulfophenyl)amino-4-fluorotriazin-6-yl, 2-(2'-chloro-5'-sulfophenyl)amino-4-fluorotriazin-6-yl, 2-(2'-methoxy-4'-sulfophenyl)amino-4-fluorotriazin-6-yl 2-(o-, m- or p-carboxyphenyl)amino-4-fluorotriazin-6-yl, 2-(2',4'-disulfophenyl)amino-4-fluorotriazin-6-yl, 2-(3',5'-disulfophenyl)amino-4-fluorotriazin-6-yl, 2-(2'-carboxy-4-sulfophenyl)amino-4-fluorotriazin-6-yl, 2-(2'-carboxy-4-sulfophenyl)amino-4-fluorotriazin-6-yl, 2-(6'-sulfonaphth-2'-yl)amino-4-fluorotriazin-6-yl, 2-(4',8'-disulfonaphth-2'-yl)amino-4-fluorotriazin-6-yl, 2-(6',8'-disulfonaphth-2'-yl)amino-4-fluorotriazin-6-yl, 2-(N-methylphenyl)amino-4-fluorotriazin-6-yl, 2-(N-ethylphenyl)amino-4-fluortriazin-6-yl, 2-(N-β-hydroxyethylphenyl)amino-4-fluorotriazin-6-yl, 2-(N-iso-propylphenyl)amino-4-fluorotriazin-6-yl, 2-morpholino-4-fluorotriazin-6-yl, 2-piperidino-4-fluorotriazin-6-yl, 2-(4',6',8'-trisulfonaphth-2'-yl)-4-fluorotriazin-6-yl, 2-(3',6',8'-trisulfonaphth-2'-yl)-4-fluorotriazin-6-yl, 2-(3',6'-disulfonaphth-1'-yl)-4-fluorotriazin-6-yl, mono-, di- or trihalopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl or -carbonyl, 2- or 3- or 4-(4',5'-dichloro-6'-pyridazin-1'-yl)phenylsulfonyl or -carbonyl, β-(4',5'-dichloro-6'-pyridazon-1'-yl)ethylcarbonyl, N-methyl-N-(2,4-dichlorotriazin-6-yl)carbamyl, N-methyl-N-(2-methylamino-4-chlorotriazin-6-yl)carbamyl, N-methyl-N-(2-dimethylamino-4-chlorotriazin-6-yl)carbamyl, N-methyl or N-ethyl-N-(2,4-dichlorotriazin-6-yl) aminoacetyl, N-methyl-N-(2,3-dichloroquinoxaline-6-sulfonyl)aminoacetyl, N-methyl-N-(2,3-dichloroquinoxaline-6-carbonyl)aminoacetyl, and the corresponding bromine and fluorine derivatives of the abovementioned chlorine-substituted heterocyclic radicals, among these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or 5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloropyrimidine-4-yl, 6-fluoro-5-trifluoromethylpyrimidin-4-yl, 6-fluoro-2-methylpyrimidin-4-yl, 6-fluoro-5-chloro-2-methylpyrimidin4-yl, 5,6-difluoropyrimidin-4-yl, 6-fluoro-5-chloro-2-trifluoromethylpyrimidin-4-yl, 6-fluoro-2-phenylpyrimidin-4-yl, 6-fluoro-5-cyanopyrimidin-4-yl, 6-fluoro-5-nitropyrimidin-4-yl, 6-fluoro-5-methylsulfonylpyrimidin-4-yl, 6-fluoro-5-phenylsulfonylpyrimidin-4-yl, triazine radicals containing sulfonyl groups, such as 2,4-bis(phenylsulfonyl)triazin-6-yl, 2-(3'-carboxyphenyl)sulfonyl-4-chlorotriazin-6-yl, 2-(3'-sulfophenyl)sulfonyl-4-chlorotriazin-6-yl, 2,4-bis(3'-carboxyphenylsulfonyl)triazin-6-yl; pyrimidine rings containing sulfonyl groups, such as 2-carboxymethylsulfonylpyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidinyl, 2,6-bis-methylsulfonylpyrimidine-4-yl, 2,6-bis-methylsulfonyl-5-chloropyrimidin-4-yl, 2,4-bis-methylsulfonylpyrimidine-5-sulfonyl, 2-methylsulfonylpyrimidin-4-yl, 2-phenylsulfonylpyrimidin-4-yl, 2-trichloromethylsulfonyl-6-methylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidine-5-sulfonyl, 2-methylsulfonyl-5-nitro-6-methylpyrimidin-4-yl, 2,5,6-tris-methylsulfonylpyrimidin-4-yl, 2-methylsulfonyl-5,6-dimethylpyridin-4-yl, 2-ethylsulfonyl-5-chloro-6-methypyrimidin-4-yl, 2-methylsulfonyl-6-chloropyrimidin-4-yl, 2,6-bis-methylsulfonyl-5-chloropyrimidin-4-yl, 2-methylsulfonyl-6-carbonylpyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -carbonyl, triazine rings containing ammonium groups, such as trimethylammonium-4-phenylamino- or -4-(o-, m- or p-sulfophenyl)aminotriazin-6-yl, 2-(1,1-dimethylhydrazinium)-4-phenylamino- or -4-(o-, m- or p-sulfophenyl)aminotriazin-6-yl, 2-(2-isopropylidene-1,1-dimethyl)hydrazinium-4-phenylamino- or -4-(o-, m- or p-sulfophenyl)aminotriazin-6-yl, 2-N-aminopyrrolidinium or 2-aminopiperidinium-4-phenylamino- or -4-(o-, m- or p-sulfophenyl)aminotriazin-6-yl, 2-N-aminopyrrolidinium or 2-N-aminopiperidinium-4-phenlyamino- or -4-(o-, m- or p-sulfophenyl)aminotriazin-6-yl, and furthermore 4-phenylamino- or 4-(sulfophenylamino)triazin-6-yl radicals which contain 1,4-bis-azabicyclo[2,2,2]octane or 1,2-bis-azabicyclo[0,3,3]octane bonded quaternally in the 2-position via a nitrogen bond, 2-pyridinium-4-phenylamino- or 4-(o-, m- or p-sulfophenyl)aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or alkoxy, or aroxy, such as phenoxy or sulfophenoxy groups; 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonyl- or 2-ethoxysulfonylbenzothiazole-5- or 6-sulfonyl- or -carbonyl-, 2-phenylsulfonylbenzothiazole-5- or -6-sulfonyl or -carbonyl and the corresponding 2-sulfobenzothiazole-5- or 6-carbonyl or -sulfonyl derivatives, containing sulfo groups in the fused-on benzene ring, 2-chlorobenzoxazole-5- or -6-carbonyl or -sulfonyl, 2-chlorobenzimidazole-5- or -6-carbonyl or sulfonyl, 2-chloro-1-methylbenzimidazole-5- or 6-carbonyl or -sulfonyl, 2-chloro-4-methyl-1,3-thiazole-5-carbonyl or -4- or -5-sulfonyl, the N-oxide of 4-chloro- or 4-nitroquinoline-5-carbonyl or also the radicals 5-chloro-2,6-difluoro-1,3-dicyanophenyl, 2,4-difluoro-1,3,5-tricyanophenyl, 2,4,5-trifluoro-1,3-dicyanophenyl, 2,4-dichloro-5-methylsulfonylpyrimidin-6-yl, 2,4-trichloro-5-ethylsulfonylpyrimidin-6-yl, 2-fluoro-5-methylsulfonyl-6'-(2'-sulfophenylamino)pyrimidin-4-yl and 2,5-dichloro-6-methylsulfonylpyrimidin-4-yl.

A group of suitable reactive groups comprises those of the formulae

—SO$_2$—Z,                               (3a)

-continued

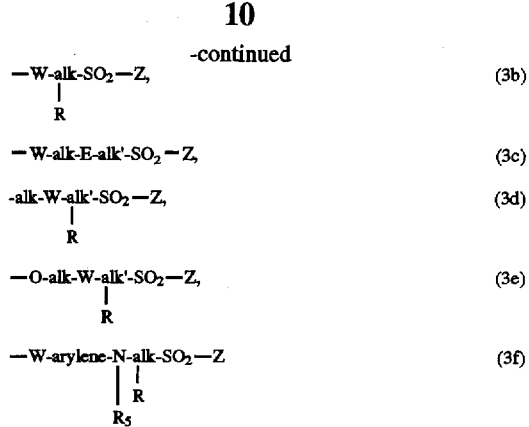

and

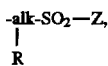
(4)

in which W is a group of the formula —SO$_2$—NR$_5$—, —CONR$_5$— or —NR$_5$CO—,

R$_5$ is hydrogen, C$_1$–C$_4$alkyl which is unsubstituted or substituted by hydroxyl, sulfo, sulfato, carboxyl or cyano, or a radical of the formula -alk-SO$_2$—Z,
 |
 R R is hydrogen, hydroxyl, sulfo, sulfato, carboxyl, cyano, halogen, C$_1$–C$_4$alkoxycarbonyl, C$_1$–C$_4$alkanoyloxy, carbamoyl or the group —SO$_2$—Z, Z is the radical —CH═CH$_2$ or —CH$_2$—CH$_2$—Y, Y is a leaving group, E is the radical —O— or —NR$_7$, R$_7$ is hydrogen or C$_1$–C$_4$alkyl, alk and alk' independently of one another are C$_1$–C$_6$alkylene, arylene is a phenylene or naphthylene radical which is unsubstituted or substituted by sulfo, carboxyl, C$_1$–C$_4$alkyl, C$_1$–C$_4$alkoxy or halogen, R$_6$ is hydrogen or C$_1$–C$_4$alkyl which is unsubstituted or substituted by carboxyl, cyano, hydroxyl, sulfo or sulfato and X is a group which can be split off as an anion and T is a radical of the formula

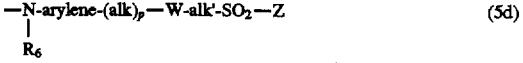

or

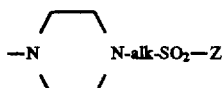
(5e)

in which R, $R_5$, $R_6$, E, W, Z, alk, alk' and arylene are as defined above and p is 0 or 1.

Suitable leaving groups Y are, for example, —Cl, —Br, —F, —$OSO_3H$, —$SSO_3H$, —OCO—$CH_3$, —$OPO_3H_2$, —OCO—$CCl_3$, —OCO—$CHCl_2$, —OCO—$CH_2Cl$, —$OSO_2$—$C_1$–$C_4$alkyl, —$OSO_2$—$N(C_1$–$C_4$alkyl$)_2$ or —OCO—$C_6H_5$.

Y is preferably a group of the formula —Cl, —$OSO_3H$, —$SSO_3H$, —OCO—$CH_3$, —OCO—$C_6H_5$ or —$OPO_3H_2$, in particular —$OSO_3H$.

alk and alk' independently of one another are, for example, a methylene, ethylene, 1,3-propylene, 1,4-butylene, 1,5-pentylene or 1,6-hexylene radical or branched isomers thereof.

alk and alk' are preferably a $C_1$–$C_4$alkylene radical, and particularly preferably an ethylene radical.

R is preferably hydrogen or the group —$O_2$—Z, in which Z is as defined above. R is particularly preferably hydrogen.

$R_5$ is preferably hydrogen, $C_1$–$C_4$alkyl or a group -alk-$O_2$—Z, in which alk and Z are in each case as defined above. $R_5$ is particularly preferably hydrogen or $C_1$–$C_4$alkyl, in particular hydrogen.

$R_6$ is preferably hydrogen or a $C_1$–$C_4$alkyl radical, and particularly preferably hydrogen.

Arylene is preferably a 1,3- or 1,4 -phenylene radical, which is unsubstituted or substituted, for example by sulfo, methyl, methoxy or carboxyl.

E is preferably —NH—, and particularly preferably —O—.

W is preferably a group of the formula —CONH— or —NHCO—.

X is, for example, fluorine, chlorine, bromine, sulfo, $C_1$–$C_4$alkylsulfonyl or phenylsulfonyl, and preferably fluorine or chlorine.

Other interesting reactive groups are those of the formula (4) in which T is a group which can be split off as an anion or is a non-reactive substituent.

A group T which can be split off as an anion is here, for example, fluorine, chlorine, bromine, sulfo, $C_1$–$C_4$alkylsulfonyl or phenylsulfonyl, and preferably fluorine or chlorine.

A non-reactive substituent T can be, for example, a hydroxyl, $C_1$–$C_4$alkoxy, $C_1$–$C_4$alkylthio, amino, N—$C_1$–$C_4$alkylamino or N,N-di-$C_1$–$C_4$alkylamino, where the alkyl is unsubstituted or substituted, for example by sulfo, sulfato, hydroxyl, carboxyl or phenyl, cyclohexylamino, morpholino or N—$C_1$–$C_4$alkyl-N-phenylamino or phenylamino or naphthylamino radical, where the phenyl or naphthyl is unsubstituted or substituted, for example by $C_1$–$C_4$alkyl, $C_1$–$C_4$alkoxy, carboxyl, sulfo or halogen.

Examples of suitable non-reactive substituents T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive substituent T is preferably amino, N-$C_1$–$C_4$alkylamino, which is unsubstituted in the alkyl part or substituted by hydroxyl, sulfato or sulfo, morpholino, phenylamino or N-$C_1$–$C_4$alkyl-N-phenylamino, in which the phenyl is in each case unsubstituted or substituted by sulfo, carboxyl, methyl or methoxy. Phenylamino or N-$C_1$–$C_4$alkyl-N-phenylamino, in which the phenyl is in each case unsubstituted or substituted by sulfo, carboxyl, methyl or methoxy, are particularly preferred.

Other interesting reactive groups are pyrimidine or quinoxaline radicals, which in each case have at least one group which can be split off as an anion. Examples are the 2,3-dichloroquinoxaline-6-carbonylamino radical, the 2,4-dichloropyrimidine-5-carbonylamino radical and the radical of the formula

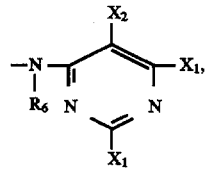
(6)

in which one of the radicals $X_1$ is a group which can be split off as an anion and the other radical $X_1$ is as defined and preferred for a non-reactive substituent T, or is a radical of the formulae (5a) to (5e) or a group which can be split off as an anion, $X_2$ is a negative substituent and $R_6$ independently is as defined under formula (4).

The radical $X_1$ which can be split off as an anion is preferably fluorine or chlorine. Examples of suitable radicals $X_2$ are nitro, cyano, $C_1$–$C_4$alkylsulfonyl, carboxyl, chlorine, hydroxyl, $C_1$–$C_4$alkoxysulfonyl, $C_1$–$C_4$alkylsulfinyl, $C_1$–$C_4$alkoxycarbonyl or $C_2$–$C_4$alkanoyl, where chlorine, cyano and methylsulfonyl are preferred for $X_2$.

Particularly preferred reactive groups are those of the formula (3a), in which Z is as defined and preferred above, in particular in which Z is a vinyl or β-sulfatoethyl radical, and those of the formula (4), in which T, X and $R_6$ are as defined and preferred above. There is particularly preferably a non-reactive radical, in particular phenylamino or N-$C_1$–$C_4$alkyl-N-phenylamino, in which the phenyl is in each case unsubstituted or substituted by sulfo, carboxyl, methyl or methoxy. X here is particularly preferably fluorine or chlorine. $R_6$ here is particularly preferably hydrogen, methyl or ethyl, in particular hydrogen. The radical of the formula (3a) is particularly preferred as the reactive group.

The substituent —$NHR_{12}$, as a halotriazinylamino radical which may be further substituted, in the radical of the formulae (2d) and (2e) is preferably a radical of the formula (4) in which $R_6$ is hydrogen; the radical of the formula $R_4$ is as preferred above.

The radical Z' in the radicals of the formulae (2g) and (2h) is preferably β-sulfatoethyl, β-haloethyl or vinyl, in particular g-sulfatoethyl or vinyl, preferably β-sulfatoethyl.

Preferably, the radicals $A_1$ and $A_2$ contain no reactive groups.

Radicals of a diazo dye are, in particular the following:
Dye radicals of a disazo dye of the formula

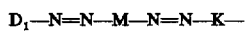
(7)

or

—D$_1$—N=N—M—N=N—K    (8).

In these formulae, D$_1$ is the radical of a diazo component of the benzene or naphthalene series, M is the radical of a middle component of the benzene or naphthalene series, K is the radical of a coupling component of the benzene, naphthalene, pyrazolone, 6-hydroxy-2-pyridone or acetoacetic acid arylamide series, where D$_1$, M and K can carry the substituents customary in azo dyes, for example those defined above. Such substituents are, in particular, C$_1$–C$_4$alkyl or C$_1$–C$_4$alkoxy which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, carboxyl, sulfomethyl, C$_2$–C$_4$alkanoylamino, benzoylamino which is unsubstituted or substituted in the phenyl ring by C$_1$–C$_4$alkyl, C$_1$–C$_4$alkoxy, halogen or sulfo, phenyl which is unsubstituted or substituted by C$_1$–C$_4$alkyl, C$_1$–C$_4$alkoxy, halogen, carboxyl or sulfo, and fibre-reactive radicals, where the fibre-reactive radicals are as defined and preferred above.

Particularly preferred radicals of a disazo dye are the following:

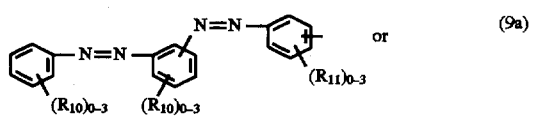    (9a)

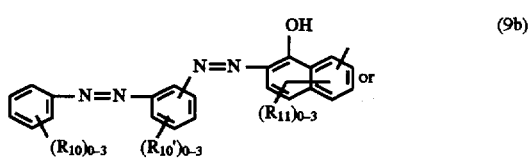    (9b)

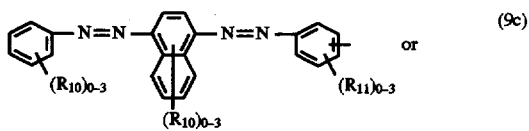    (9c)

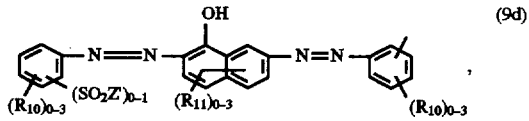    (9d)

in which R$_{10}$ is 0 to 3 identical or different substituents from the group comprising C$_1$–C$_4$alkyl, C$_1$–C$_4$alkoxy, halogen, carboxyl and sulfo, R$_{10}$' is as defined for R$_{10}$ and can additionally be C$_1$–C$_4$hydroxyalkoxy or C$_1$–C$_4$sulfatoalkoxy, R$_{11}$ is 0 to 3 identical or different substituents from the group comprising halogen, nitro, cyano, trifluoromethyl, sulfamoyl, carbamoyl, C$_1$–C$_4$alkyl, C$_1$–C$_4$alkoxy, amino, acetylamino, ureido, hydroxyl, carboxyl, sulfomethyl and sulfo and Z' is β-سulfatoethyl, β-thiosulfatoethyl, β-phosphatoethyl, β-acyloxyethyl, β-haloethyl or vinyl.

The radicals of the formulae (9a) to (9d) can also contain, as further substituents in the phenyl or naphthyl rings, a radical of the formula —SO$_2$Z' in which Z' is β-sulfatoethyl, β-thiosulfatoethyl, β-phosphatoethyl, β-acyloxyethyl, β-haloethyl or vinyl. Z' is preferably β-sulfatoethyl or vinyl, in particular vinyl.

The radical of a formazan dye is preferably a dye radical of the formula

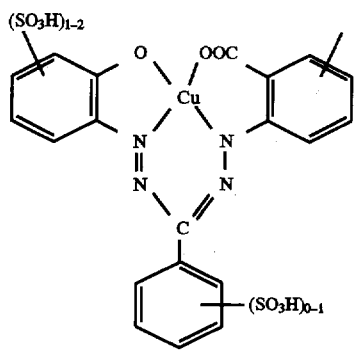    (9e)

or

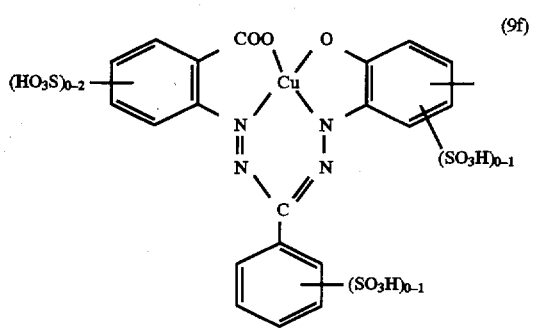    (9f)

or

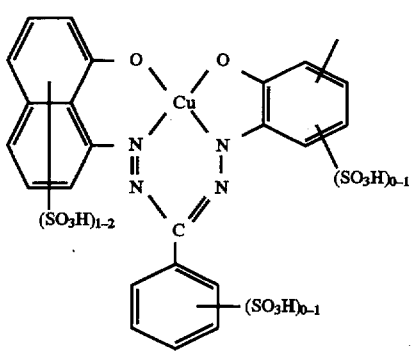    (9g)

or

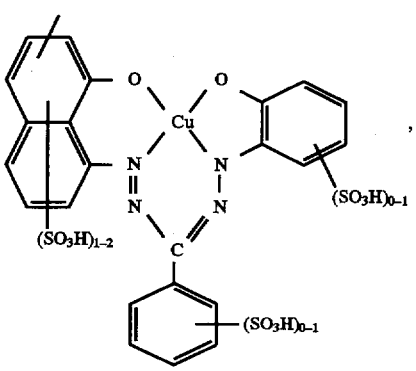    (9h)

in which the benzene nuclei contain no further substituents or are further substituted by C$_1$–C$_4$alkyl, C$_1$–C$_4$alkoxy, C$_1$–C$_4$alkylsulfonyl, halogen or carboxyl.

The radical of a phthalocyanine dye is preferably a radical of the formula

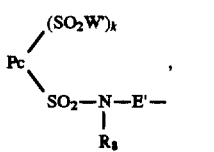

(10)

in which Pc is the radical of a metal phthalocyanine, in particular the radical of a copper phthalocyanine or nickel phthalocyanine;

W' is —OH and/or —NR$_9$R$_9$';

R$_9$ and R$_9$' independently of one another are hydrogen or C$_1$–C$_4$alkyl which is unsubstituted or substituted by hydroxyl or sulfo;

R$_8$ is hydrogen or C$_1$–C$_4$alkyl;

E' is a phenylene radical which is unsubstituted or substituted by C$_1$–C$_4$alkyl, halogen, carboxyl or sulfo, or a C$_2$–C$_6$alkylene radical; and k is 1 to 3.

R$_9$ and R$_9$' are preferably hydrogen. E' is preferably a phenylene radical which is unsubstituted or substituted by C$_1$–C$_4$alkyl, halogen, carboxyl or sulfo.

The radical of a dioxazine dye is preferably a radical of the formula

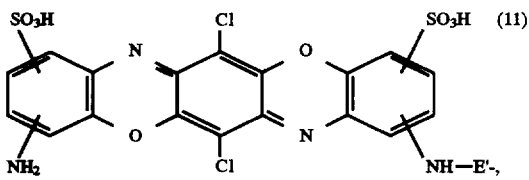

(11)

in which E' is a phenylene radical which is unsubstituted or substituted by C$_1$–C$_4$alkyl, halogen, carboxyl or sulfo, or a C$_2$–C$_6$alkylene radical, and the outer benzene rings in the formula (11) contain no further substituents or are further substituted by C$_1$–C$_4$alkyl, C$_1$–C$_4$alkoxy, acetylamino, nitro, halogen, carboxyl, sulfo or —SO$_2$—Z', in which Z' is β-sulfatoethyl, β-thiosulfatoethyl, β-phosphatoethyl, β-acyloxyethyl, β-haloethyl or vinyl.

The radical of an anthraquinone dye is preferably a radical of the formula

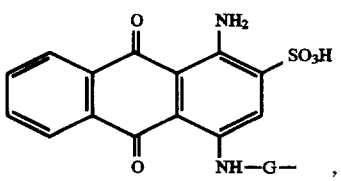

(12)

in which G is a phenylene, cyclohexylene, phenylenemethylene or C$_2$–C$_6$alkylene radical, and in which the anthraquinone nucleus can be substituted by a further sulfo group and a phenyl radical G can be substituted by C$_1$–C$_4$alkyl, C$_1$–C$_4$alkoxy, halogen, carboxyl or sulfo, and the dye preferably contains at least 2 sulfo groups. G is preferably a phenyl radical which is unsubstituted or substituted by C$_1$–C$_4$alkyl, C$_1$–C$_4$alkoxy, halogen, carboxyl or sulfo.

The radical A$_1$ is preferably a radical of the formulae (2a) to (2h), (9a) to (9h), (10), (11) or (12), in particular a radical of the formulae (9a) to (9h), (10), (11) or (12).

A$_1$ and A$_2$ are very particularly preferably radicals of an anthraquinone, phthalocyanine, dioxazine, formazan or disazo dye or radicals of the formulae (2a) to (2h), where A$_1$ and A$_2$ have different meanings to one another. In particular, A$_1$ and A$_2$ are different radicals of the formulae (2a) to (2h), (9a) to (9h), (10), (11) or (12).

Very particularly important reactive dyes of the formula (1) are those in which A$_f$ is a radical of the formulae (9a) to (9h), (10), (11) or (12) and A$_2$ is a radical of the formulae (2a) to (2h), (9a) to (9h), (10), (11) or (12).

The radicals Y$_1$, Y$_2$, R$_1$, R$_2$, R$_3$, R$_4$ and B of the reactive dyes of the formula (1) are as defined and preferred above here.

Very particularly important reactive dyes of the formula (1) are those in which

Y$_1$ and Y$_2$ independently of one another are fluorine or chlorine,

R$_1$, R$_2$, R$_3$ and R$_4$ independently of one another are hydrogen, methyl or ethyl, in particular hydrogen, B is a C$_2$–C$_{12}$alkylene radical, which can be interrupted by 1,2 or 3 —O— radicals, and A$_1$ and A$_2$ are as defined and preferred above.

The present invention furthermore relates to a process for the preparation of reactive dyes of the formula (1), which comprises reacting radicals of the formulae $$A_1\text{—}N(R_1)H \quad (13a)$$

and $$A_2\text{—}N(R_4)H \quad (13b)$$

or corresponding dye intermediates, at least one halotriazine compound and one diamine of the formula $$\begin{array}{c} HN\text{—}B\text{—}NH \\ |\quad\quad\; | \\ R_2\quad\; R_3 \end{array} \quad (14)$$

in which A$_1$, A$_2$, R$_1$, R$_2$, R$_3$, R$_4$ and B are as defined under formula (1), with one another in any sequence, or, if dye intermediates are used, by convening the resulting intermediates into the desired dyes, and if appropriate then carrying out a further conversion reaction.

The preparation of the end dyes from intermediates is, in particular, a coupling reaction which leads to azo dyes.

Since the individual process steps defined above can be carried out in various sequences, if appropriate in some cases also at the same time, various process variants are possible. The reaction is in general carried out stepwise in succession, the sequence of the simple reactions between the individual reaction components advantageously depending on the particular conditions.

One process variant comprises subjecting one of the radicals of the formulae (13a) and (13b) to a condensation reaction with a halotriazine compound, subjecting the resulting product to a condensation reaction with a diamine of the formula (14) and reacting the resulting reaction product with the other radical of the formulae (13b) and (13a), which has first been subjected to a condensation reaction with a halotriazine compound.

The halotriazine compounds used are preferably cyanuric halides, for example cyanuric chloride or cyanuric fluoride. A carboxypyridinium compound is as a rule introduced after a condensation reaction on the corresponding cyanuric halides.

The compounds of the formulae (13a), (13b) and (14) and the halotriazine compounds are known or can be obtained analogously to known compounds.

The individual condensation reactions are carried out, for example, by a process known per se, as a rule in aqueous solution, at a temperature of, for example, 0° to 50° C. and a pH of, for example, 4 to 9.

The dyes of the formula (1) according to the invention which contain a sulfo or sulfato group are either in the form of their free acid or, preferably, in the form of salts thereof. Salts are, for example, the alkali metal, alkaline earth metal or ammonium salts or the salts of an organic amine. Examples are the sodium, lithium, potassium or ammonium salts or the salt of mono-, di- or triethanolamine.

The dyes according to the invention are suitable for dyeing and printing the most diverse materials, such as fibre material containing hydroxyl groups or containing nitrogen. Examples are silk, leather, wool, polyamide fibres and polyurethanes, and in particular all types of cellulosic fibre materials. Such cellulosic fibre materials are, for example, the natural cellulosic fibres, such as cotton, linen and hemp, and cellulose and regenerated cellulose. The dyes according to the invention are also suitable for dyeing or printing the fibres containing hydroxyl groups which are contained in blend fabrics, for example mixtures of cotton with polyester fibres or polyamide fibres. The dyes according to the invention are particularly suitable for dyeing or printing cellulosic fibre materials. They can furthermore be used for dyeing or printing natural or synthetic polyamide fibre materials.

The dyes according to the invention can be applied to the fibre material and fixed on the fibre in various ways, in particular in the form of aqueous dye solutions and printing pastes. They are suitable both for the exhaust method and for dyeing by the pad-dyeing method, in which the goods are impregnated with aqueous dye solutions, which contain salts if appropriate, and the dyes are fixed after an alkali treatment or in the presence of alkali, if appropriate under the action of heat. They are particularly suitable for the so-called cold pad-batch process, in which the dye is applied to the padder together with the alkali and is then fixed by storage at room temperature for several hours. After fixing, the dyeings or prints are rinsed thoroughly with cold and hot water, if appropriate with the addition of an agent which has a dispersing action and promotes diffusion of the non-fixed portions.

The dyes according to the invention have a high reactivity, good fixing capacity and a very good build-up capacity. They can therefore be used by the exhaust dyeing method at low dyeing temperatures, and require only short steaming times in the pad-steam process. The degrees of fixing are high and the non-fixed portions can easily be washed out, the difference between the degree of exhaustion and degree of fixing being remarkably small, i.e. the soaping loss is very low. The dyes according to the invention are also particularly suitable for printing, in particular on cotton, and also for printing nitrogen-containing fibres, for example wool or silk or blend fabrics which comprise wool or silk.

The dyeings and prints produced with the dyes according to the invention have a high colour strength and a high fibre-dye bond stability both in the acid and in the alkaline range, and furthermore a good light-fastness and very good wet-fastness properties, such as fastnesses to washing, water, sea water, crossdyeing and perspiration, as well as a good fastness to pleating, fastness to ironing and fastness to rubbing.

The following examples serve to illustrate the invention. Temperatures are stated in degrees Celsius and parts and percentages are by weight, unless stated otherwise. Parts by weight bear the same relation to parts by volume as the kilogram to the liter.

EXAMPLE 1

14 parts of cyanuric fluoride are added dropwise to a neutral solution of 53 parts of 1-amino-4-(3-amino-2,4,6-trimethyl-5-sulfophenyl)anthraquinone-2-sulfonic acid and 5 parts of disodium hydrogen phosphate in 500 parts of water at a temperature below 2° C.; during this procedure, the pH is kept constant by addition of sodium hydroxide solution. When the reaction has ended, 6 parts of ethylenediamine in 54 parts of water are added dropwise such that the temperature does not exceed 5° C. and the pH remains at a value of 6. The pH is then kept at a value of 6.

A solution of 1-amino-4-{3-[4-(2-aminoethylamino)-6-fluoro-1,3,5-triazin-2-ylamino]-2,4,6-trimethyl-5-sulfophenyl}anthraquinone-2-sulfonic acid (solution 1).

14 parts of cyanuric fluoride are added dropwise to a neutral solution of 60 parts of the copper complex of 5-amino-3-[3-phenyl-5-(2-carboxy-5-sulfophenyl)-1-formazano]-4-hydroxybenzenesulfonic acid and 5 parts of disodium hydrogen phosphate in 500 parts of water at a temperature below 2° C.; during this procedure, the pH is kept constant by addition of sodium hydroxide solution.

A solution of 5-[4,6-difluoro-1,3,5-triazin-2-ylamino]-3-[3-phenyl-5-(2-carboxy-5-sulfophenyl)-1-formazano]-4-hydroxybenzenesulfonic acid is obtained (solution 2).

Solution 2 is added to solution 1 and the pH is increased to and kept at a value of 8.5. The mixture is allowed to warm to room temperature, the solution is freed from salts by dialysis and the dye is evaporated. A dye which, in the form of the free acid, corresponds to the compound of the formula

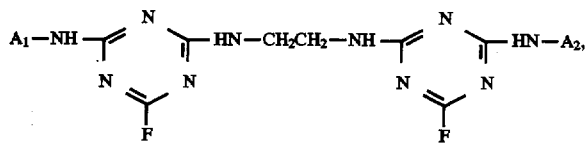

in which $A_1$ is a radical of the formula

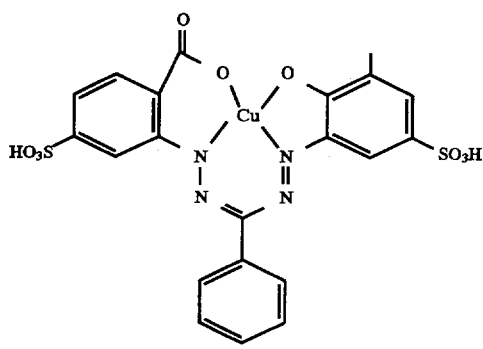

and A₂ is a radical of the formula

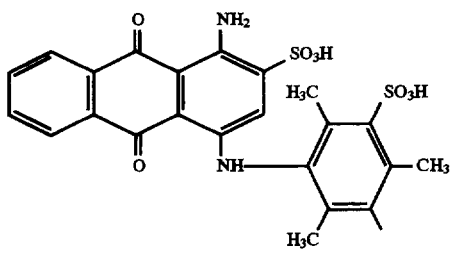

is obtained. The resulting dye dyes cotton in brilliant blue colour shades.

EXAMPLE 2

19 parts of cyanuric chloride are stirred vigorously into 50 parts of water, with addition of a wetting agent and 5 parts of disodium hydrogen phosphate, at a temperature of 0° C. A neutral solution of 53 parts of 1-amino-4-(3-amino-2,4, 6-trimethyl-5-sulfophenyl)anthraquinone-2-sulfonic acid in 450 parts of water is added dropwise; during this procedure, the pH is kept at a value of 4.5 by addition of sodium hydroxide solution. When the reaction has ended, 6 parts of ethylenediamine in 54 parts of water are added dropwise such that the temperature remains below 15° C. and the pH remains at a value of 7. The pH is then increased to and kept at a value of 8.5. To bring the conversion to completion, the mixture is heated to a temperature of 40° C. towards the end of the reaction.

A solution of 1-amino-4-{3-[(2-aminoethylamino)-6-chloro-1,3,5-triazin-2-ylamino]-2,4,6-trimethyl-5-sulfophenyl }anthraquinone-2-sulfonic acid (solution 1) is obtained.

19 parts of cyanuric chloride are stirred vigorously into 50 parts of water, with addition of a wetting agent and 5 parts of disodium hydrogen phosphate, at a temperature of 0° C. A neutral solution of 48 parts of 2-(2-acetylamino-4-aminophenylazo)naphthalene-1,5-disulfonic acid in 450 parts of water is added dropwise, during which the pH is kept at a value of 4.5 by addition of sodium hydroxide solution. A solution of 2-[2-acetylamino-4-(4,6-dichloro-1, 3,5-triazin-2-ylamino)phenylazo]naphthalene-1,5-disulfonic acid is obtained (solution 2).

Solution 2 is added to solution 1 and the pH is increased to and kept at a value of 8.5. To bring the conversion to completion, the mixture is heated to a temperature of 40° C. towards the end of the reaction. The solution is freed from salts by dialysis and the dye is evaporated. A dye which, in the form of the free acid, corresponds to the compound of the formula

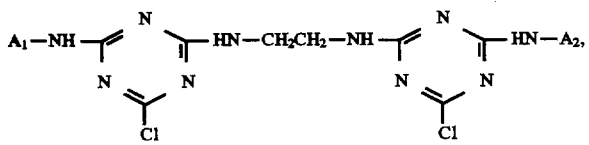

in which A₁ is a radical of the formula

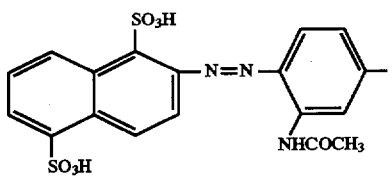

and A₂ is a radical of the formula

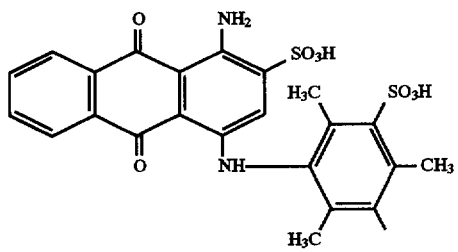

is obtained. The resulting dye dyes cotton in brilliant green colour shades.

EXAMPLES 3 to 187

Dyes of the formula

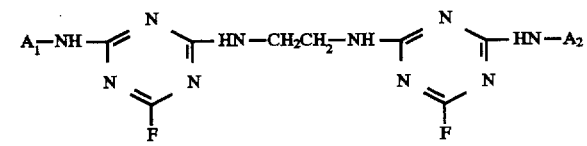

in which A₁ and A₂ are as defined in columns 2 and 3 in the following Table 1, can be obtained in a manner analogous to that described in Example 1. The dyes dye cotton in the colour shades shown in column 4 in Table 1. The radicals A₁ and A₂ are identified with the letters A to Z5, which are defined as follows:

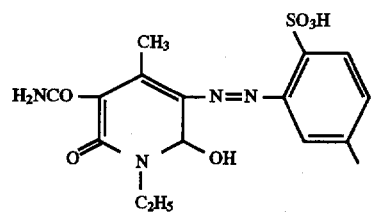 A
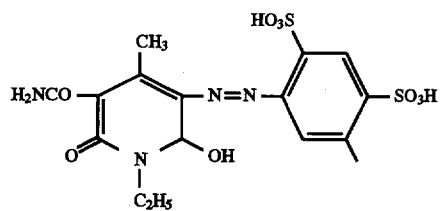 B
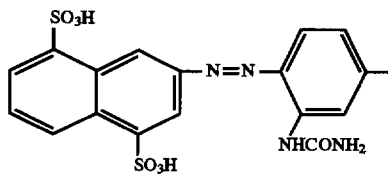 C
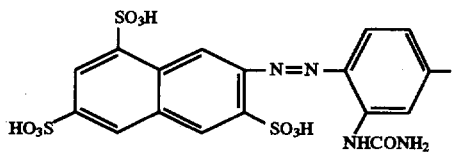 D
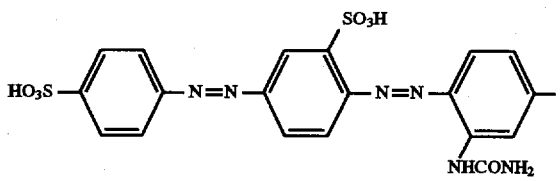 E
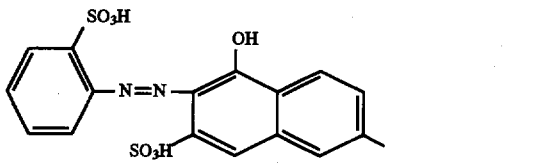 F
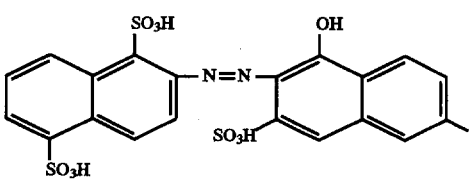 G
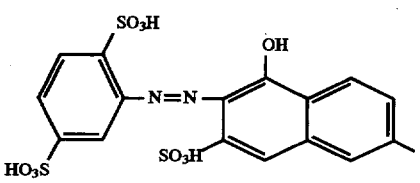 H
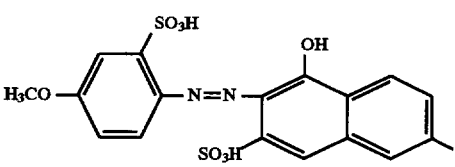 I

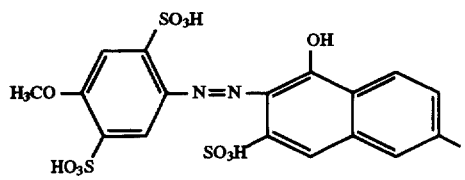
J
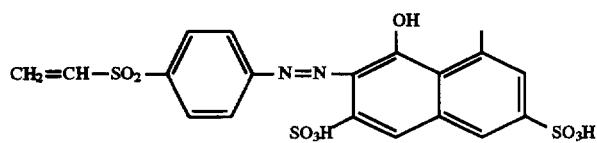
K
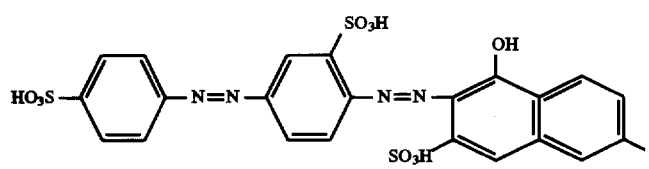
L
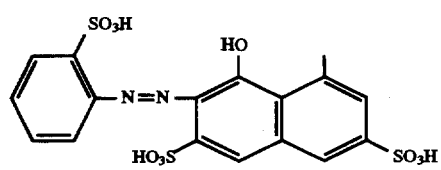
M
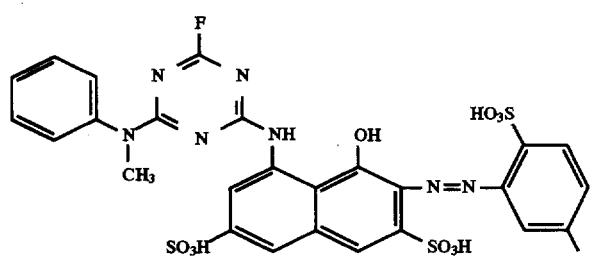
N
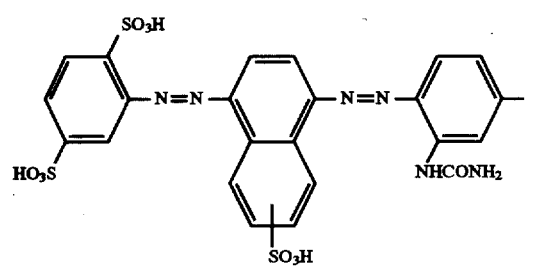
O
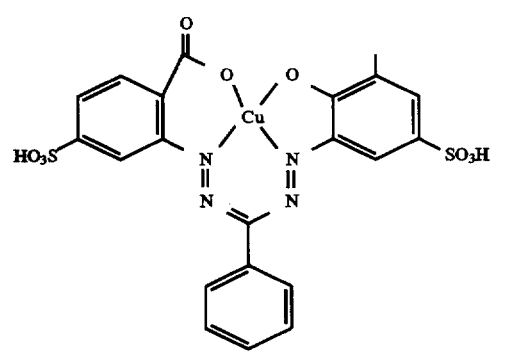
P -continued
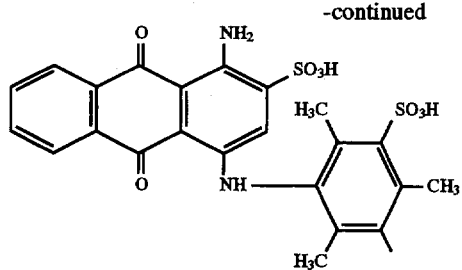
Q
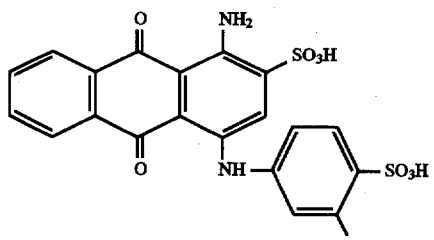
R
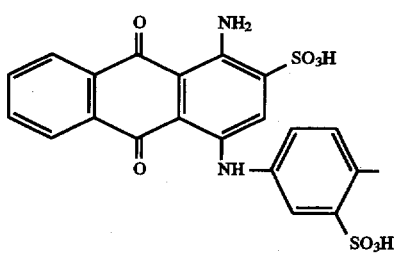
S
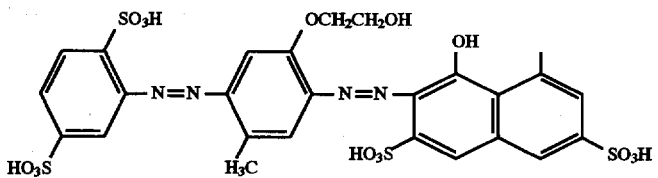
T
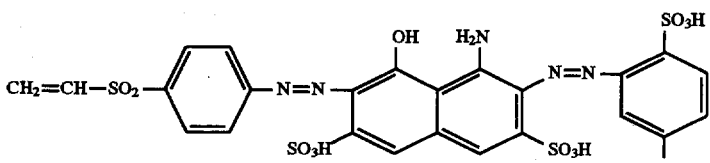
U
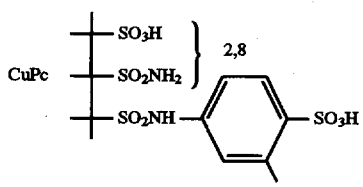
V
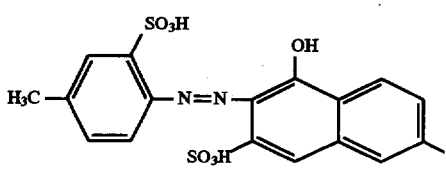
W
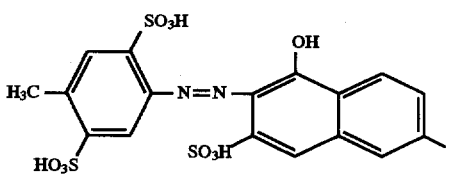
X -continued
Y
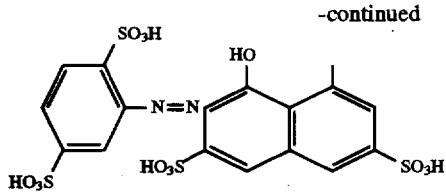
Z
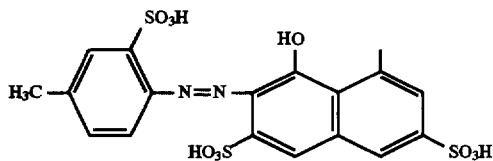
Z1
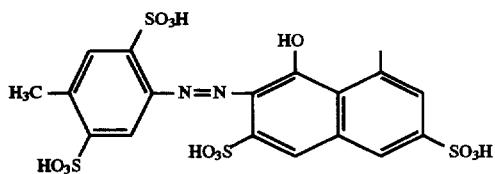
Z2
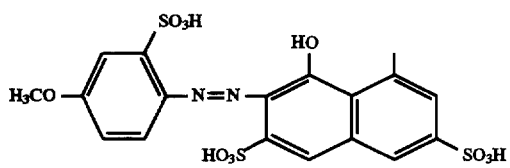
Z3
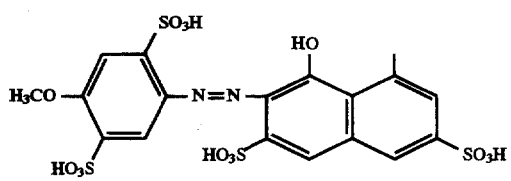
Z4
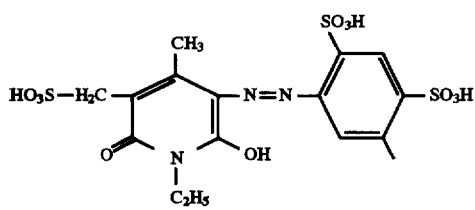
Z5
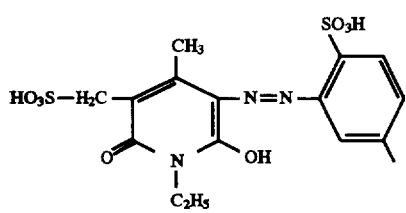
| Ex. | $A_1$ | $A_2$ | Colour shade on cotton |
|---|---|---|---|
| 3 | A | P | green |
| 4 | A | Q | green |
| 5 | A | R | green |
| 6 | A | S | green |
| 7 | A | T | green |
| 8 | A | U | green |
| 9 | A | V | brilliant green |
| 10 | B | P | green |
| 11 | B | Q | green |
| 12 | B | R | green |
| 13 | B | S | green |
| 14 | B | T | green |
| 15 | B | U | green |
| 16 | B | V | brilliant green |
| 17 | C | L | reddish-tinged orange |
| 18 | C | P | olive |
| 19 | C | Q | olive |
| 20 | C | R | olive |
| 21 | C | S | olive |
| 22 | D | P | olive |
| 23 | D | Q | olive |
| 24 | D | R | olive |

TABLE 1-continued

| Ex. | A₁ | A₂ | Colour shade on cotton |
|---|---|---|---|
| 25 | D | S | olive |
| 26 | E | L | scarlet |
| 27 | E | O | brown |
| 28 | E | T | olive |
| 29 | E | U | olive |
| 30 | F | G | orange |
| 31 | F | H | orange |
| 32 | F | I | reddish-tinged orange |
| 33 | F | J | reddish-tinged orange |
| 34 | F | L | scarlet |
| 35 | F | M | scarlet |
| 36 | F | N | scarlet |
| 37 | G | H | scarlet |
| 38 | G | I | red-orange |
| 39 | G | J | red-orange |
| 40 | G | L | scarlet |
| 41 | G | M | scarlet |
| 42 | G | N | scarlet |
| 43 | H | I | red-orange |
| 44 | H | J | red-orange |
| 45 | H | L | scarlet |
| 46 | H | M | scarlet |
| 47 | H | N | scarlet |
| 48 | I | J | scarlet |
| 49 | I | L | red |
| 50 | I | M | red |
| 51 | I | N | red |
| 52 | J | L | red |
| 53 | J | M | red |
| 54 | J | N | red |
| 55 | K | L | red |
| 56 | K | M | red |
| 57 | K | N | red |
| 58 | K | P | violet |
| 59 | K | S | violet |
| 60 | K | U | claret |
| 61 | K | V | claret |
| 62 | L | M | red |
| 63 | L | N | red |
| 64 | L | P | violet |
| 65 | L | S | violet |
| 66 | L | U | violet |
| 67 | L | V | violet |
| 68 | M | N | red |
| 69 | M | P | violet |
| 70 | M | S | violet |
| 71 | M | U | violet |
| 72 | M | V | violet |
| 73 | N | P | violet |
| 74 | N | S | violet |
| 75 | N | U | violet |
| 76 | N | V | violet |
| 77 | P | Q | blue |
| 78 | P | R | blue |
| 79 | P | S | blue |
| 80 | P | T | blue |
| 81 | P | U | blue |
| 82 | Q | R | blue |
| 83 | Q | S | blue |
| 84 | Q | T | blue |
| 85 | Q | U | blue |
| 86 | R | S | blue |
| 87 | R | T | blue |
| 88 | R | U | blue |
| 89 | S | T | blue |
| 90 | S | U | blue |
| 91 | T | U | navy blue |
| 92 | W | M | yellowish-tinged red |
| 93 | W | Y | red-brown |
| 94 | W | Z | yellowish-tinged red |
| 95 | W | Z1 | yellowish-tinged red |
| 96 | W | Z2 | red |
| 97 | W | Z3 | red |
| 98 | W | L | red |
| 99 | W | J | red |
| 100 | W | I | red |
| 101 | W | G | scarlet |
| 102 | W | F | orange |
| 103 | X | M | yellowish-tinged red |
| 104 | X | Y | scarlet |
| 105 | X | Z | yellowish-tinged red |
| 106 | X | Z1 | yellowish-tinged red |
| 107 | X | Z2 | red |
| 108 | X | Z3 | red |
| 109 | X | L | red |
| 110 | X | J | scarlet |
| 111 | X | I | scarlet |
| 112 | X | F | scarlet |
| 113 | X | G | scarlet |
| 114 | Y | F | yellowish-tinged red |
| 115 | Y | G | yellowish-tinged red |
| 116 | Y | H | yellowish-tinged red |
| 117 | Y | I | red |
| 118 | Y | J | red |
| 119 | Y | K | red |
| 120 | Y | L | red |
| 121 | Y | N | red |
| 122 | Y | P | violet |
| 123 | Y | S | violet |
| 124 | Y | U | violet |
| 125 | Y | V | brown |
| 126 | Z | F | yellowish-tinged red |
| 127 | Z | G | yellowish-tinged red |
| 128 | Z | H | yellowish-tinged red |
| 129 | Z | I | red |
| 130 | Z | J | red |
| 131 | Z | K | red |
| 132 | Z | L | red |
| 133 | Z | N | red |
| 134 | Z | P | violet |
| 135 | Z | S | violet |
| 136 | Z | U | violet |
| 137 | Z | V | brown |
| 138 | Z1 | F | yellowish-tinged red |
| 139 | Z1 | G | yellowish-tinged red |
| 140 | Z1 | H | yellowish-tinged red |
| 141 | Z1 | I | red |
| 142 | Z1 | J | red |
| 143 | Z1 | K | red |
| 144 | Z1 | L | red |
| 145 | Z1 | N | red |
| 146 | Z1 | P | violet |
| 147 | Z1 | S | violet |
| 148 | Z1 | U | violet |
| 149 | Z1 | V | brown |
| 150 | Z2 | F | red |
| 151 | Z2 | G | red |
| 152 | Z2 | H | red |
| 153 | Z2 | I | red |
| 154 | Z2 | J | red |
| 155 | Z2 | K | red |
| 156 | Z2 | L | red |
| 157 | Z2 | N | bluish-tinged red |
| 158 | Z2 | P | violet |
| 159 | Z2 | S | violet |
| 160 | Z2 | U | violet |
| 161 | Z2 | V | brown |
| 162 | Z3 | F | red |
| 163 | Z3 | G | red |
| 164 | Z3 | H | red |
| 165 | Z3 | I | red |
| 166 | Z3 | J | red |
| 167 | Z3 | K | red |
| 168 | Z3 | L | red |
| 169 | Z3 | N | bluish-tinged red |
| 170 | Z3 | P | violet |
| 171 | Z3 | S | violet |
| 172 | Z3 | U | violet |
| 173 | Z3 | V | brown |
| 174 | Z4 | P | green |
| 175 | Z4 | Q | green |
| 176 | Z4 | R | green |
| 177 | Z4 | S | green |
| 178 | Z4 | T | green |

TABLE 1-continued

| Ex. | A₁ | A₂ | Colour shade on cotton |
|-----|----|----|------------------------|
| 179 | Z4 | U | green |
| 180 | Z4 | V | brilliant green |
| 181 | Z5 | P | green |
| 182 | Z5 | Q | green |
| 183 | Z5 | R | geen |
| 184 | Z5 | S | green |
| 185 | Z5 | T | green |
| 186 | Z5 | U | green |
| 187 | Z5 | V | brilliant green |

EXAMPLES 188 to 374

Dyes of the formula

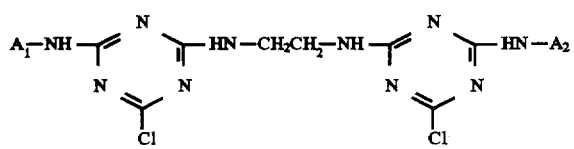

in which $A_1$ and $A_2$ are as defined in Example 1 or in columns 2 and 3 in Examples 3 to 187 of the above Table 1 can be obtained in a manner analogous to that described in Example 2. The dyes dye cotton in the colour shades stated in Example 1 and in column 4 in Table 1.

The procedure described in Examples 1 to 374 is followed, except that a diamine of the formula

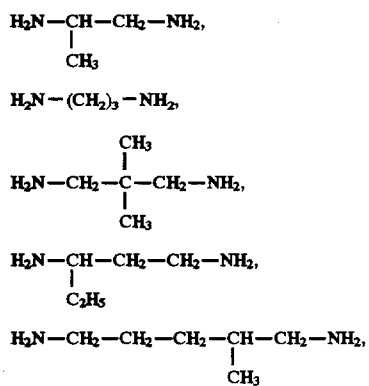

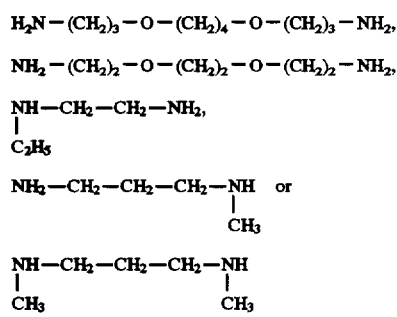

is used instead of ethylenediamine, affording analogous dyes having corresponding alkylene bridge members.

Dyeing instructions 2 parts of the reactive dye obtained according to Example 1 are dissolved in 400 parts of water, 1500 parts of a solution which contains 53 g of sodium chloride per liter are added. 100 parts of cotton fabric are introduced into this dyebath at 40° C. After 45 minutes, 100 parts of a solution which contains 16 g of sodium hydroxide and 20 g of calcined sodium carbonate per liter are added. The temperature of the dye bath is kept at 40° C. for a further 45 minutes. Thereafter, the dyed goods are rinsed, soaped at the boil with a nonionic detergent for a quarter of an hour, rinsed again and dried.

Printing instructions 3 parts of the reactive dye obtained according to Example 2 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the resulting printed material is steamed in saturated steam at 102° C. for 2 minutes. The printed fabric is then rinsed, soaped at the boil, if appropriate, and rinsed again, and then dried.

What is claimed is:

1. A reactive dye of the formula

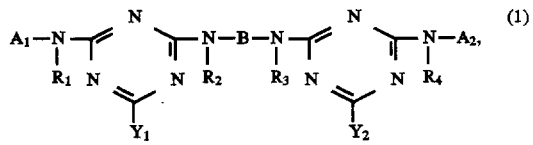

in which $R_1$, $R_2$, $R_3$ and $R_4$ independently of one another are hydrogen or substituted or unsubstitued $C_1$–$C_4$alkyl, B is an aliphatic bridge member, $Y_1$ and $Y_2$ independently of one another are halogen or carboxypyridinium, $A_1$ is the radical of a phthalocyanine, dioxazine, formazan or disazo dye, or a radical of the formula

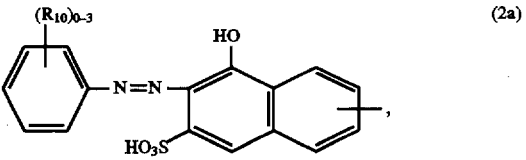

in which $R_{10}$ is 0 to 3 identical or different substituents selected from the group consisting of $C_1$–$C_4$alkyl, $C_1$–$C_4$alkoxy, halogen, carboxyl and sulfo,

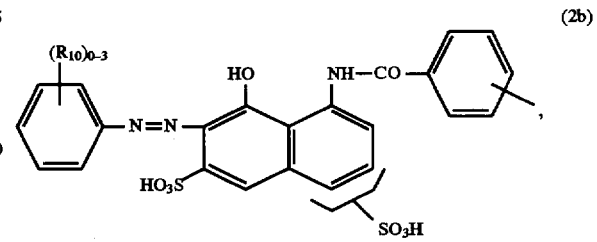

in which $R_{10}$ is 0 to 3 identical or different substituents selected from the group consisting of $C_1$–$C_4$alkyl, $C_1$–$C_4$alkoxy, halogen, carboxyl and sulfo,

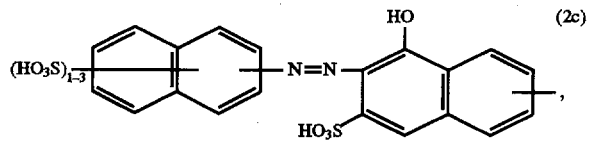
(2c)

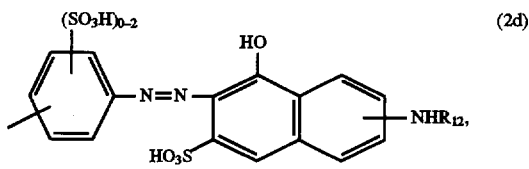
(2d)

in which $R_{12}$ is $C_1$–$C_4$alkanoyl, benzoyl or a halotriazinyl radical, which contains no further substituents or is further substituted,

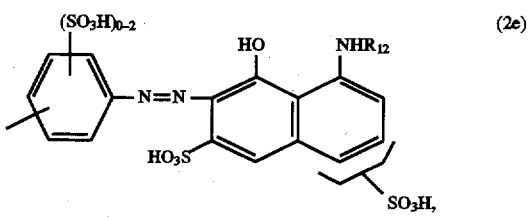
(2e)

in which $R_{12}$ is $C_1$–$C_4$alkanoyl, benzoyl or a halotriazinyl radical, which contains no further substituents or is further substituted,

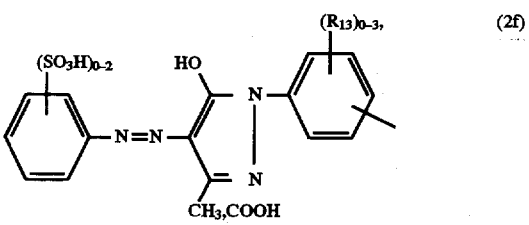
(2f)

in which $R_{13}$ is 0 to 3 identical or different substituents selected from the group consisting of $C_1$–$C_4$alkyl, $C_1$–$C_4$alkoxy, halogen, carboxyl and sulfo,

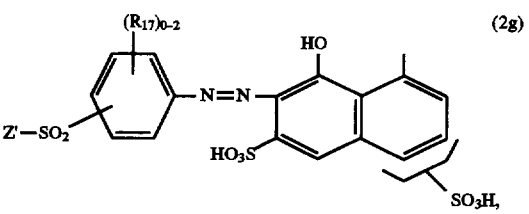
(2g)

in which $R_{17}$ is 0 to 2 identical or different substituents selected from the group consisting of $C_1$–$C_4$alkyl, $C_1$–$C_4$alkoxy, halogen, carboxyl and sulfo; and Z' is β-sulfatoethyl, β-thiosulfatoethyl, β-phosphatoethyl, β-acyloxyethyl, β-haloethyl or vinyl, or

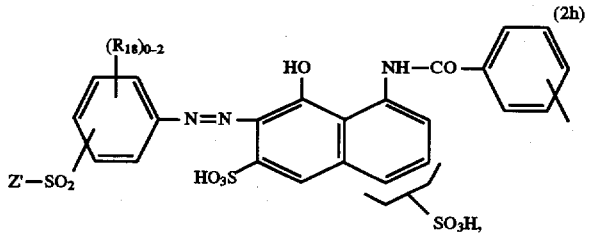
(2h)

in which $R_{18}$ is 0 to 2 identical or different substituents selected from the group consisting of $C_1$–$C_4$alkyl, $C_1$–$C_4$alkoxy, halogen, carboxyl and sulfo; and Z' is β-sulfatoethyl, β-thiosulfatoethyl, β-phosphatoethyl, β-acyloxyethyl, β-haloethyl or vinyl, and $A_2$ is a radical of the formula

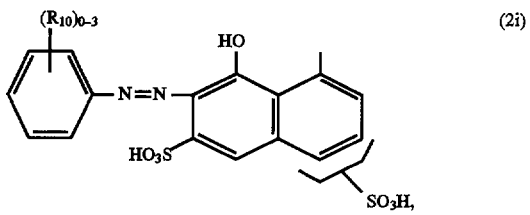
(2i)

in which $R_{10}$ is 0 to 3 identical or different substituents selected from the group consisting of $C_1$–$C_4$alkyl, $C_1$–$C_4$alkoxy, halogen, carboxyl and sulfo,

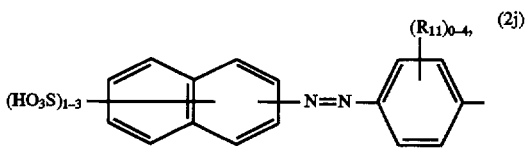
(2j)

in which $R_{11}$ is 0 to 4 identical or different substituents selected from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo,

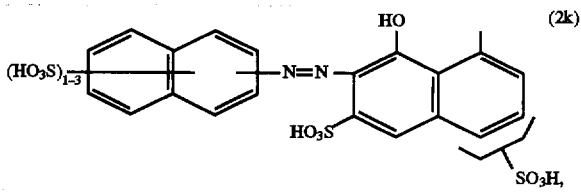
(2k)

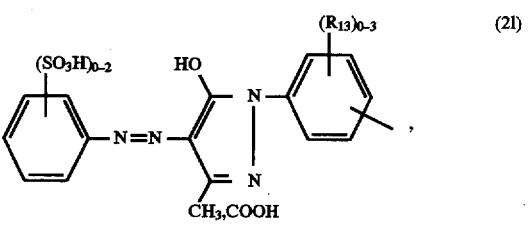
(2l)

in which $R_{13}$ is 0 to 3 identical or different substituents selected from the group consisting of $C_1$–$C_4$alkyl, $C_1$–$C_4$alkoxy, halogen, carboxyl and sulfo, or

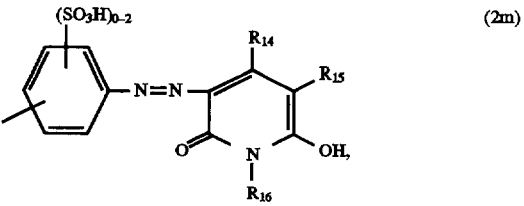
(2m)

in which $R_{14}$ and $R_{16}$ independently of one another are hydrogen, $C_1$–$C_4$alkyl or phenyl, and $R_{15}$ is hydrogen, cyano, carbamoyl or sulfomethyl.

2. A reactive dye according to claim 1, in which $Y_1$ and $Y_2$ independently of one another are fluorine or chlorine.

3. A reactive dye according to claim 1, in which $R_1$, $R_2$, $R_3$ and $R_4$ independently of one another are hydrogen, methyl or ethyl.

4. A reactive dye according to claim 1, in which B is a $C_2$-$C_{12}$ alkylene radical which can be interrupted by 1, 2 or 3 members from the group comprising —NH—, —N(CH₃)— and —O— and is unsubstituted or substituted by hydroxyl, sulfo or sulfato.

5. A reactive dye according to claim 1, in which B is a $C_2$-$C_{12}$alkylene radical, which can be interrupted by 1, 2 or 3 —O— radicals.

6. A reactive dye according to claim 1, in which B is a $C_2$-$C_6$alkylene radical.

7. A reactive dye according to claim 1, in which $A_1$ is a radical of the formulae (2a) to (2h),

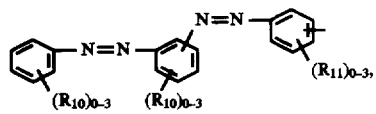
(9a)

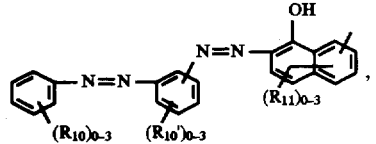
(9b)

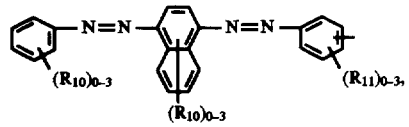
(9c)

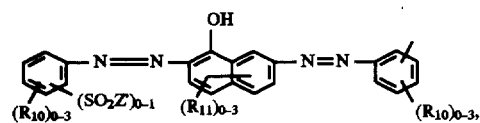
(9d)

in which $R_{10}$ is 0 to 3 identical or different substituents selected from the group consisting of $C_1$-$C_4$alkyl, $C_1$-$C_4$alkoxy, halogen, carboxyl and sulfo, $R_{10}'$ is as defined for $R_{10}$ and can additionally be $C_1$-$C_4$hydroxyalkoxy or $C_1$-$C_4$sulfatoalkoxy, $R_{11}$ is 0 to 3 identical or different substituents selected from the group consisting of halogen, nitro, cyano, trifluoromethyl, sulfamoyl, carbamoyl, $C_1$-$C_4$alkyl, $C_1$-$C_4$alkoxy, amino, acetylamino, ureido, hydroxyl, carboxyl, sulfomethyl and sulfo and Z' is β-sulfatoethyl, β-thiosulfatoethyl, β-phosphatoethyl, β-acyloxyethyl, β-haloethyl or vinyl,

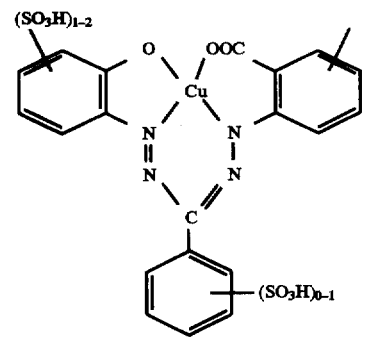
(9e)

or

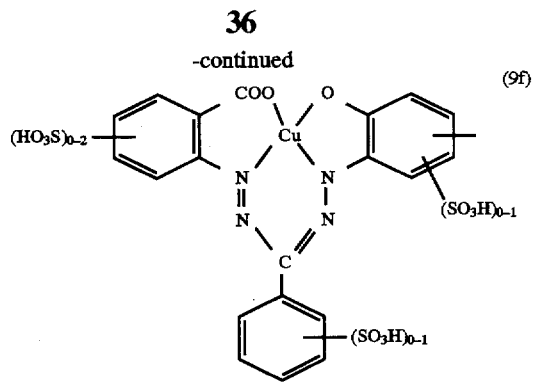
(9f)

or

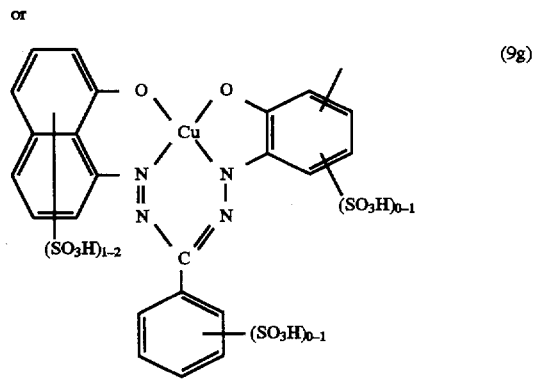
(9g)

or

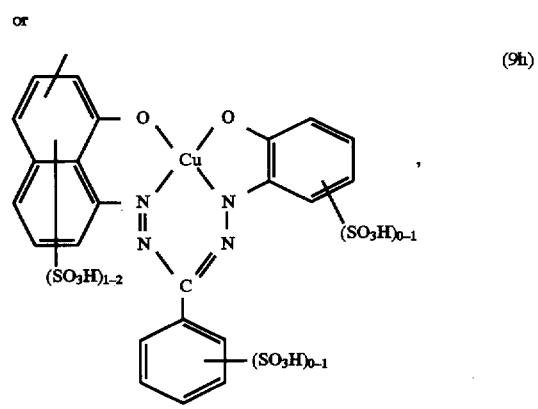
(9h)

in which the benzene nuclei contain no further substituents or are further substituted by $C_1$-$C_4$alkyl, $C_1$-$C_4$alkoxy, $C_1$-$C_4$alkylsulfonyl, halogen or carboxyl,

(10)

in which Pc is the radical of a metal phthalocyanine;

W' is —OH and/or —NR₉R₉';

$R_9$ and $R_9'$ independently of one another are hydrogen or $C_1$-$C_4$alkyl which is unsubstituted or substituted by hydroxyl or sulfo;

$R_8$ is hydrogen or $C_1$-$C_4$alkyl;

E' is a phenylene radical which is unsubstituted or substituted by $C_1$-$C_4$alkyl, halogen, carboxyl or sulfo, or a $C_2$-$C_6$alkylene radical; and k is 1 to 3,

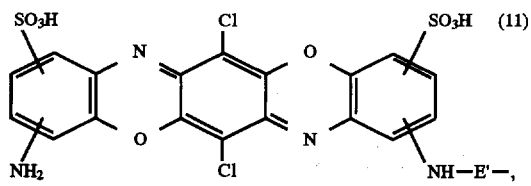

in which E' is a phenylene radical which is unsubstituted or substituted by $C_1$–$C_4$alkyl, halogen, carboxyl or sulfo, or a $C_2$–$C_6$alkylene radical, and the outer benzene rings in the formula (11) contain no further substituents or are further substituted by $C_1$–$C_4$alkyl, $C_1$–$C_4$alkoxy, acetylamino, nitro, halogen, carboxyl, sulfo or —$O_2$—Z', in which Z' is β-sulfatoethyl, β-thiosulfatoethyl, β-phosphatoethyl, β-acyloxyethyl, β-haloethyl or vinyl.

8. A reactive dye according to claim 7, in which $A_1$ is a radical of the formulae (9a) to (9h), (10), or 11.

9. A reactive dye according to claim 1, in which the radicals $A_1$ and $A_2$ in each case contain at least one sulfo group.

10. A process for dyeing or printing fibre material containing hydroxyl groups or containing nitrogen, which comprises the step of applying to said fibre material a tinctorial amount of a reactive dye according to claim 1.

11. A process according to claim 10 wherein said fibre material is cellulosic fibre material or natural or synthetic polyamide fibre material.

* * * * *